United States Patent

[11] 3,617,682

[72] Inventor Robert N. Hall
Schenectady, N.Y.
[21] Appl. No. 835,694
[22] Filed June 23, 1969
[45] Patented Nov. 2, 1971
[73] Assignee General Electric Company

[54] SEMICONDUCTOR CHIP BONDER
10 Claims, 5 Drawing Figs.

[52] U.S. Cl. .......... 219/85, 29/471.1, 29/484, 29/498, 219/86, 228/4
[51] Int. Cl. .......... B23k 1/04
[50] Field of Search .......... 219/85, 78, 86, 117, 243; 29/203 V, 470, 471.1, 498, 484, 8; 228/4

[56] References Cited
UNITED STATES PATENTS

| | | | |
|---|---|---|---|
| 236,972 | 1/1881 | Ball | 219/233 X |
| 379,822 | 3/1888 | Seiler | 219/376 |
| 3,274,667 | 9/1966 | Siebertz | 29/498 X |
| 3,294,951 | 12/1966 | Olson | 219/85 X |
| 3,353,263 | 11/1967 | Helms | 29/471.1 X |
| 2,757,324 | 7/1956 | Pearson | 219/85 X |
| 3,006,122 | 10/1961 | Weishaus | 219/243 UX |
| 3,051,826 | 8/1962 | Avila | 219/85 X |
| 3,070,683 | 12/1962 | Moro-Lin et al. | 219/85 X |
| 3,095,492 | 6/1963 | Gaiennie | 219/243 |
| 3,165,818 | 1/1965 | Soffa et al. | 219/85 X |
| 3,197,608 | 7/1965 | Ingraham | 219/85 |
| 3,271,555 | 9/1966 | Hirshon et al. | 219/85 |
| 3,369,954 | 2/1968 | Fener | 219/243 X |

*Primary Examiner*—J. V. Truhe
*Assistant Examiner*—L. A. Schultzman
*Attorneys*—John F. Ahern, Paul A. Frank, Jerome C. Squillaro, Frank L. Neuhauser, Oscar B. Waddell and Joseph B. Forman

ABSTRACT: An apparatus for attaching semiconductor chips to gold pads is described as comprising a stainless steel hot stage mounted on top of a heater block having a temperature of approximately 300° C. with a platinum ribbon heater or an RF heater element protruding through a hole in the hot stage and flush with the top surface thereof so as to provide a local hot spot smaller than the gold pads to which the semiconductor chips are to be attached. A current passed through the platinum causes heating to a temperature sufficient to eutectically bond the chip to the gold pad. An inert atmosphere is provided during the bonding operation to enhance the accuracy and reproducibility of the bond.

INVENTOR:
ROBERT N. HALL,
by
HIS ATTORNEY

INVENTOR:
ROBERT N. HALL,
by [signature]
HIS ATTORNEY

SEMICONDUCTOR CHIP BONDER

The present invention relates to the fabrication of semiconductor devices and more particularly to an apparatus for bonding a semiconductive device to the surface of an electrode.

In the field of semiconductor fabrication it is often necessary to form a bond between the semiconductor wafer or chip and a gold pad or contact. The gold pad may, as in the case of microelectronic circuitry, be deposited on a thin ceramic circuit substrate. Techniques for bonding gold to semiconductive materials such as germanium or silicon have developed over the years. One such gold bonding process involves positioning a semiconductor wafer on a gold or gold-plated contact, applying a predetermined force between the elements and elevating the temperature of the combination to about 370° C. until a eutectic bond forms. Various techniques have been utilized to effect the desired heating; one such technique involves applying electrodes to opposite ends of the gold pad and applying a current therethrough to heat the pad to the desired temperature. This technique, although in widespread use, is not satisfactory since a slight difference in thickness of the gold pad will vary the temperature attained for a given current and accordingly, good electrical and mechanical contacts are not reliably produced. Further, it is not uncommon to cause damage to the semiconductor wafer by overheating. Also, in the case of thin gold pads, an excessive current may burn out the gold pad completely. It is also generally desirable that the heated area be confined to the immediate neighborhood of the gold pad that is to be bonded in order not to alter the electrical characteristics of other parts of the circuit by overheating them during the bonding operation.

With the advent of microelectronic circuitry wherein multiple circuit functions are performed on a single substrate, the need for accurately making reproducible bonds has greatly increased since poor bonding techniques greatly reduce the yield of the desired product which in turn results in a higher unit cost. Accordingly, there is a serious need for a bonding process and apparatus for performing this process which can provide accurate and reproducible bonds between semiconductor wafers and gold electrodes substantially independent of the thickness of the gold electrode, do not damage the semiconductor wafer or the surrounding circuit components, and can be performed easily and rapidly.

It is therefore an object of the present invention to provide a means for bonding semiconductor wafers to gold electrodes with accuracy and reproducibility without damage to the wafer or the gold electrode.

It is a further object of the invention to provide a gold-semiconductor bond wherein the temperature at which the eutectic bond is formed is substantially independent of the thickness of the gold electrode.

It is a further object of the invention to provide a means of making bonds which confines the heated portion of the substrate to the immediate neighborhood of the bonding area in order not to alter or damage the surrounding electrical components of the circuit.

It is a still further object of the present invention to provide apparatus for making bonds which can be performed rapidly, easily, and with high reliability so as to improve the yield of the resultant product.

Briefly, the present invention attains these and other objects by utilizing a bonding apparatus comprising a stainless steel hot stage mounted on a heater block adjusted to a temperature of approximately 300° C. with a heater element protruding through an aperture in the surface of the hot stage with the heater element in contact with the opposite surface of a substrate to which a gold electrode or pad is secured and to which a semiconductor wafer is to be attached. In one embodiment, a platinum ribbon is used as the heater element and a predetermined current is applied therethrough to cause local heating of the substrate and the gold pad. In another embodiment, an RF heated tip is used as the heater element. In both embodiments, a semiconductor wafer in contact with the gold pad forms an eutectic bond at a temperature of approximately 380° C. The bond is formed in a nitrogen atmosphere so that the formation and wetting of the eutectic bond is more reproducible and complete.

The novel features believed characteristic of the invention are set forth in the appended claims. The invention itself, together with further objects and advantages thereof, may best be understood by reference to the following description taken in connection with the appended drawing wherein:

Figure 1:
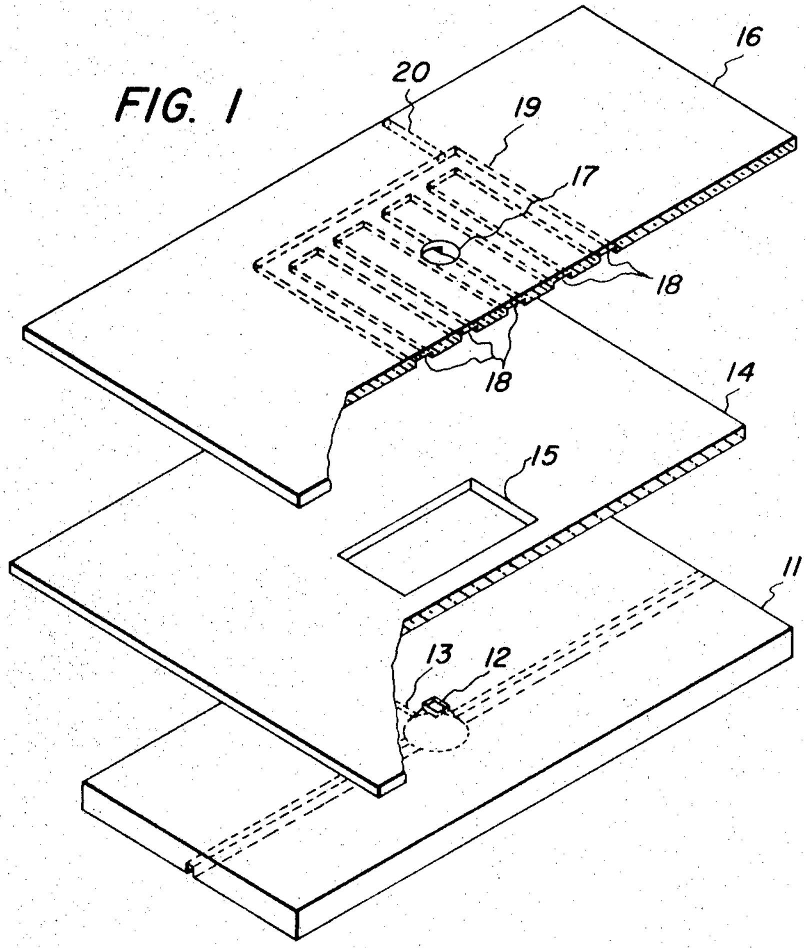
FIG. 1 is a perspective view of a hot stage with two positioning plates useful in practicing the instant invention.

Referring to FIG. 1 there is illustrated a rectangular-shaped hot stage 11 preferably made of stainless steel having a centrally located aperture 12 extending through the thickness of the hot stage 11. On one surface of the hot stage 11, the aperture 12 presents a generally square opening, which as illustrated more clearly in FIG. 2, abruptly flares to a much larger circular opening on the other side of the hot stage 11. The generally conically shaped aperture 12 has an inlet 13 extending from the tapered wall of the aperture 12 to the outer edge of the hot stage 11. Directly above and in confronting parallel relationship with the hot stage 11 is a lower plate 14 having a centrally located rectangular opening 15 therein. Above the lower plate 14 and in parallel relationship therewith, is an upper plate 16 having a centrally located circular aperture 17. On the side of the upper plate 16 in confronting relation with the lower plate 14 is a plurality of parallel grooves 18 interconnected at the ends thereof by a pair of transverse grooves 19, only one of which is illustrated in FIG. 1 for purposes of clarity. Extending from the edge of the upper plate 16 to the intersection of the grooves 18 and 19, is an inlet 20. As will be described hereinafter, inlets 13 and 20 are utilized for admitting a cover gas into the region around the aperture 12. Whereas hot stage 11 is made of stainless steel and hence has a high thermal conductivity, plates 14 and 16 are preferably made of a transparent low thermal conductivity material, such as fused quartz, or a form of fused quartz sold under the trademark Vycor. Ceramic, Pyrex, mica or other low thermal conductivity materials could be used.

Figure 2:
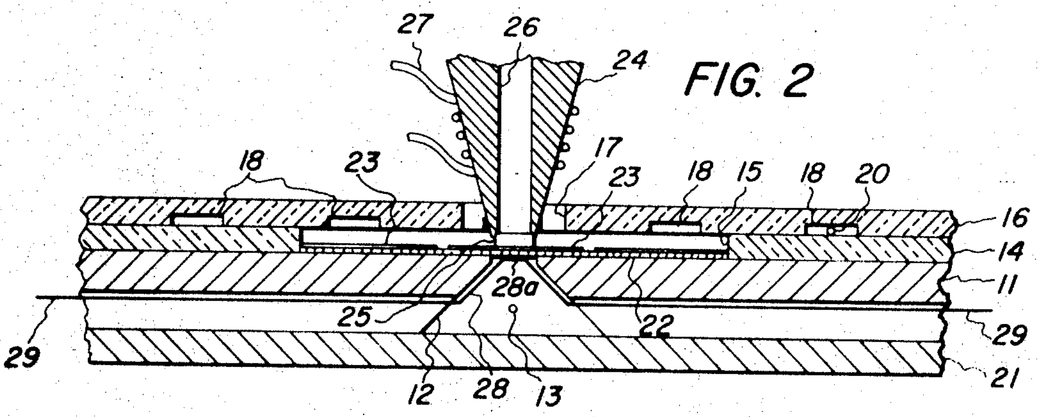
FIG. 2 is a cross-sectional end view of one embodiment of the invention.

Referring now to FIG. 2, the hot stage 11 with lower and upper plates 14 and 16, respectively, are positioned above a thermostatically controlled heater block 21. Also illustrated in FIG. 2 is a substrate member 22 positioned within the rectangular opening 15 and in juxtaposed relationship with the hot stage 11. The substrate member 22 may be made of ceramic, for example, or any other insulating material useful in supporting semiconductor elements. Positioned on the upper surface of the substrate member 22 is a gold pad 23 which may, for example, be deposited thereon by vacuum deposition. Positioned above the gold pad 23 by a collet 24 is a semiconductor chip or wafer 25 which may, for example, be silicon or germanium. The collet 24 has a vacuum line 26 extending centrally therethrough and terminating at the tip thereof whereby semiconductor chips can be picked up at one station and be placed in position over the gold pad 23. The collet 24 has a nichrome heater element 27 coiled about the tip thereof and connected to a source of electrical energy (not illustrated) for maintaining the collet temperature at a desired level, preferably approximately 300° C.

Figure 3:
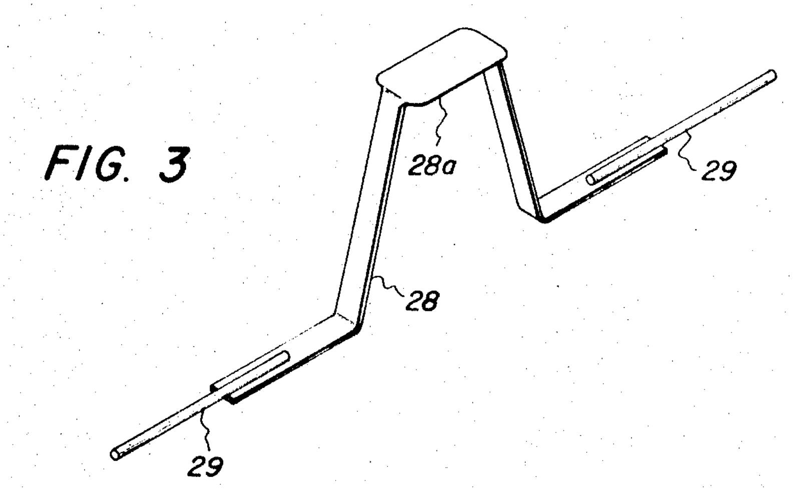
FIG. 3 is a perspective view of a heater element made in accordance with the teachings of the instant invention.

Referring now to FIG. 3, a platinum heater filament 28 is illustrated as being connected at the ends thereof to nickel wires 29. The filament 28 is preferably a flat ribbon having an inverted U-shape with a reduced thickness 28*a* at the central portion thereof. The purpose of the reduced thickness portion 28*a* is to increase the resistance per unit area and thereby increase the heating in that area. The heater filament 28 is positioned (by adjustment means not illustrated for purposes of clarity) within the conically shaped aperture 12, as illustrated in FIG. 2, so that the reduced thickness portion 28*a* of the filament is flush with the surface of the hot stage 11 and in contacting relation with the substrate member 22.

In operation, the heater member 21 is brought to a temperature of approximately 300° C. and thermostatically maintained at that value. A cover gas such as nitrogen, argon, helium or other inert gas is introduced into the inlets 13 and 20 along the edges of the heater block 11 and the upper plate 16, respectively. A substrate member 22 having a gold pad 23 thereon, is placed in the rectangular opening 15 by lifting the upper plate 16 and sliding the substrate member into position. The lower plate is then moved so as to position the gold pad 23 directly above the heater filament 28. The collet 24 is then used to pick up a semiconductor chip from an adjacent station and place it down on the gold pad 23 and apply pressure thereto. A current is then applied between the nickel wires 29 to cause heating of the platinum heater filament 28. Typically, the current is approximately 30 amperes applied for a period of approximately 15 seconds. During this interval, cover gas is entering through inlets 13 and 20 and flowing around the bonding area and is exiting through aperture 17. At the end of this time interval, the semiconductor chip 25 is ultrasonically scrubbed against the gold pad 23, to ensure good alloying. The ultrasonic scrubbing may, for example, be performed by ultrasonically moving the collet 24. Techniques for ultrasonically moving the collet are well known in the art and are not considered a part of the instant invention.

After the platinum heater current is turned off, the collet 24 may be raised and the process repeated for other semiconductor chips. During the entire bonding operation, the cover gas applied at the inlets 13 and 20 completely blankets the substrate member 22, both in the vicinity of the gold pad 23 and in the vicinity of the platinum heater filament 28. The cover gas performs several functions; namely, to assist in the formation and wetting of the eutectic bond so that the bond is more reproducible and complete. Additionally, the cover gas forms a cushion between the platinum heater filament 28 and the substrate member 22 during the interval when the collet 24 is not pressing a chip against a gold pad. During this interval, the substrate member 22 can be very easily moved to a new location for application of the next semiconductor chip by sliding lower plate 14 in a horizontal direction. The cushion formed by the cover gas is such that the substrate member 22 floats on the gas and thereby eliminates wear on the platinum heater filament 28 as the substrate member 22 is moved between each bonding operation.

Figure 4:
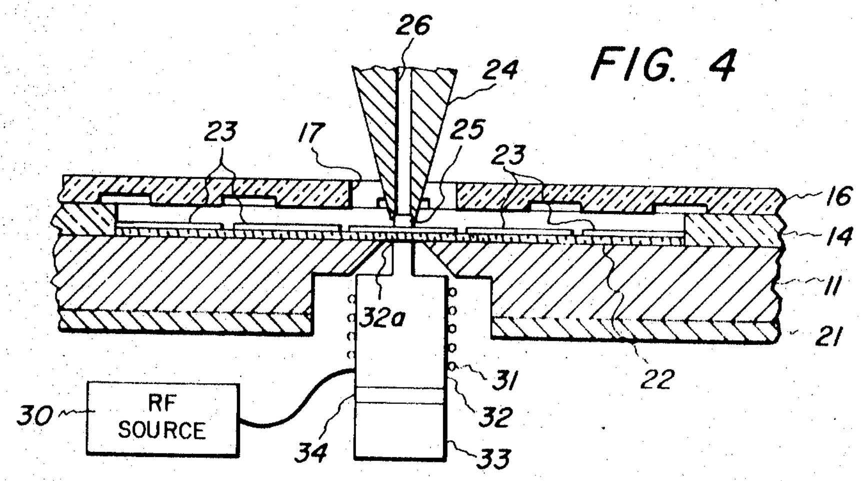
FIG. 4 is a cross-sectional end view of another embodiment of the invention.

Referring now to FIG. 4, an alternative embodiment of the invention is illustrated as comprising a hot stage 11, above which is positioned the substrate member 22 with a gold pad 23 applied thereto. A collet 24 is illustrated as positioning a semiconductor chip 25 over the gold pad 23. Whereas the embodiment illustrated in FIG. 3 utilizes a platinum heater filament, the embodiment of FIG. 4 utilizes a radiofrequency (RF) source 30 connected to a heater element 31 which may comprise a nichrome block member 32 with a portion thereof 32*a* in contacting relation with the substrate member 22. The nichrome block member 32 is held in position by a support member 33 which is thermally insulated from the nichrome block member 32 by an insulator 34. The function of the insulator 34 is to prevent the conduction of the heat generated by the RF coils 31 from being conducted away from the nichrome block member 32. As illustrated, the portion 32*a* of the nichrome block member 32 is adjusted to be flush with the surface of the hot stage 11 so that the heat generated by the RF heating element 31 can be conducted readily through the substrate 22 to the gold pad 23 and the semiconductor chip 25, thereby permitting the formation of the eutectic bond. Although not illustrated, adjustment means can be provided for positioning the nichrome block member 32 to the desired position. As a further alternative means of applying local heating to the lower surface of substrate 22, a stream of hot nitrogen can be directed through aperture 12 from below, using a hot-gas gun.

In addition to the attainment of accuracy and reproducibility in the formation of the eutectic bond by properly controlling the temperature reached by the heated portion of substrate 22, it is essential that the heated portion of substrate 22 be restricted to the immediate neighborhood of the area to which the bond is to be made in order not to damage or alter the electrical properties of the surrounding circuit elements. In the embodiments illustrated in FIGS. 2 and 4, this has been accomplished by providing close thermal contact between the surrounding portions of substrate 22 and hot stage 11 which is maintained at a temperature which is determined by the thermostatically controlled heater block 21, and which in the example cited above was chosen to be approximately 300° C.

Figure 5:
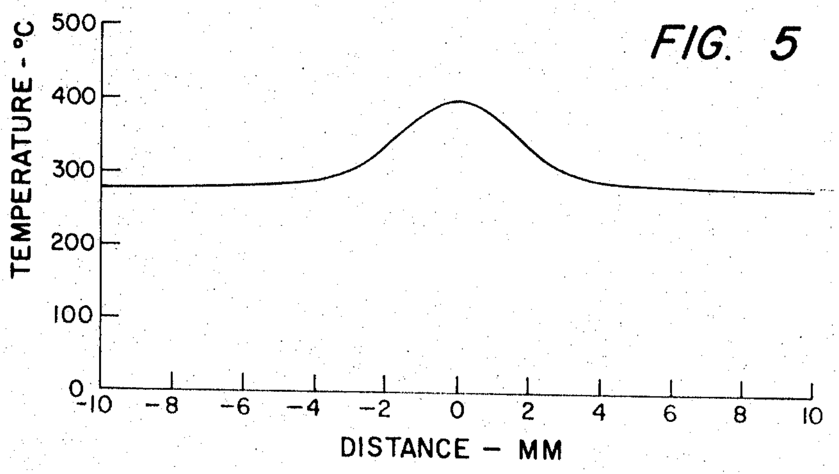
FIG. 5 illustrates a typical temperature distribution along the substrate.

The temperature distribution as a function of distance from the center of the semiconductor chip was found to be a very sharply defined region. FIG. 5 illustrates a typical temperature distribution as a function of distance from the center of the semiconductor chip. From this curve, it is readily apparent that adjacent components are not unnecessarily subjected to the higher bonding temperatures. Thus, degradation of the sensitive transistor and other circuit elements is greatly reduced since the temperature is localized and is only present for a short period of time.

The extent of the lateral spreading of the temperature distribution is determined by the size of aperture 12 surrounding heater element 28*a*. If aperture 12 is too large, then the diameter of the heated region of substrate 22 will be so large that the surrounding circuit elements on substrate 22 will be subjected to excessive temperatures and their electrical properties may be undesirably altered. On the other hand, if aperture 12 is too small, then the thermal gradient within substrate 22 will be too great with the result that excessive stresses due to thermal expansion will be generated, causing cracks to develop in substrate 22. A suitable size for aperture 12 is approximately 3 mm. square for a heater element having a contact portion 28*a* that is approximately 1 to 1.5 mm. square. The optimum size of aperture 12 will, of course, depend upon the thickness and thermal expansion properties of substrate 22. Accordingly, the foregoing dimensions are for purposes of illustration only and not by way of limitation.

In summary, there is disclosed an apparatus for attaching semiconductor chips to gold pads in which the eutectic bond is formed at a temperature which is controlled very accurately and is substantially independent of the thickness of the gold pad.

While only certain preferred features of the invention have been shown by way of illustration, many modifications and changes will occur to those skilled in the art.

What I claim as new and desire to secure by Letters Patent of the United States is:

1. The combination comprising:
an insulating substrate having a gold pad attached to one surface thereof;
means holding a semiconductor chip in contacting relation with said gold pad; and
separate heating means for providing heat directed solely to a localized area on the opposite surface of said insulating substrate smaller than the size of said paid to form a eutectic bond between said pad and said chip.

2. The combination of claim 1 further comprising:
means providing a cover gas in the vicinity of said bond to improve the formation and wetting thereof.

3. The combination of claim 1 wherein said separate heating means providing heat comprises:
a platinum ribbon filament in contacting relation with the opposite surface of said substrate.

4. The combination of claim 1 wherein said separate heating means providing heat comprises:
an RF heater element in contacting relation with said substrate.

5. The combination of claim 1 wherein said means holding a semiconductor chip comprises:

a collet having a heater element attached thereto to maintain said collet at a substantially constant predetermined temperature.

6. The combination of claim 1 further comprising:

means for adjustably positioning said substrate with respect to the heating means.

7. The combination of claim 2 wherein said separate heating means providing heat comprises:

a platinum ribbon heater filament in contacting relation with said substrate.

8. The combination of claim 7 wherein said cover gas is selected from the group consisting of nitrogen, argon and helium.

9. The combination of claim 8 further comprising:

means including a pair of low thermal conductivity plates for adjustably positioning said substrate with respect to said filament and for controlling the flow of cover gas over the substrate, thereby excluding air from the bonding region.

10. The combination of claim 9 wherein said means holding a semiconductor chip comprises:

a collet having a heater element attached thereto to maintain said collet at a substantially constant temperature.

* * * * *